G. H. BRIGGS & J. T. CLARKSON.
COUPLING-JOINT.
No. 179,764.
Patented July 11, 1876.
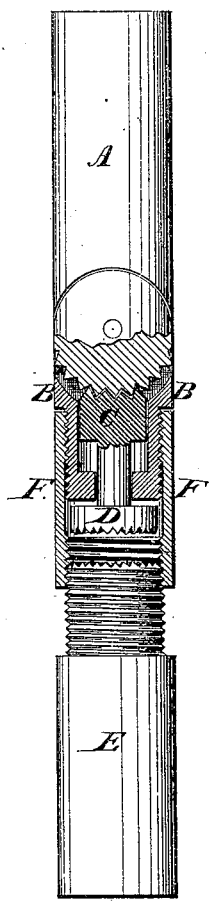
Witnesses
W. L. Clarkson
F. R. Whitcher
Inventor
George H. Briggs
Joseph T. Clarkson

UNITED STATES PATENT OFFICE.

GEORGE H. BRIGGS AND JOSEPH T. CLARKSON, OF AMESBURY, MASS.

IMPROVEMENT IN COUPLING-JOINTS.

Specification forming part of Letters Patent No. 179,764, dated July 11, 1876; application filed February 4, 1876.

*To all whom it may concern:*

Be it known that we, GEORGE H. BRIGGS and JOSEPH T. CLARKSON, both of Amesbury, in the county of Essex and State of Massachusetts, have invented certain Improvements in Mechanical Combinations, of which the following is a specification:

The object of our invention is to make a joint which may be adjusted and held at any desired angle, where it is necessary to direct mechanical power, and hold it firmly at a given point. This may be done by attaching our invention.

The accompanying drawing shows a longitudinal sectional view of our invention.

A is the upper or movable portion of the joint, having its lower part tenon-shaped and the end notched, so as to receive like notches in piston C. B is the lower part of the joint, being mortised or cored out, so as to allow the end of A to enter and be pivoted to the same, as well as to allow the piston C to rise and drop freely. D is a disk, attached to the lower end of piston C, having around its lower face a notched surface, fitting into a corresponding surface on the upper end of the lower portion of the joint E. F is a coupling or sleeve, having a right and left thread on its inner circumference, to bring the ends B and E together, so as to press the piston C against the end A, and thus hold the end A firmly in any desired position.

We claim as our invention in mechanical combinations—

1. The combination of the following elements or parts, viz: first, a notched or toothed tenon or end of upper part of joint A; second, a mortised or cored piece, B, into which the notched end of A enters and is pivoted, substantially as set forth.

2. The combination of the following elements or parts, viz: first, a notched or toothed tenon or end of upper part of joint A; second, a mortised or cored piece, B, into which the notched end of A enters and is pivoted; third, a piston, C, having a notched end to fit into the end A, to prevent the same from moving when the piston C is pressed against it, substantially as set forth.

3. The combination of the following elements or parts, viz: first, a disk, D, attached to the lower part of the piston C, and having around its lower face a notched surface, fitting a corresponding notched surface attached to the lower end of the joint E, for the purpose of preventing any lateral motion of the upper end of joint A when being held at a desired angle; second, a coupling or sleeve, F, having a right and left thread upon its inner circumference, and applied to the end of the mortised or cored piece B and the upper end of piece E, by which the whole mechanism is worked, substantially as set forth.

4. The combination of the following elements or parts, viz: first, a notched or toothed tenon or end of upper part of joint A; second, a mortised or cored piece, B, into which the notched end of A enters and is pivoted; third, a piston, C, having a notched or toothed end to fit into the end A, to prevent the same from moving when the piston C is pressed against it; fourth, a disk, D, attached to the lower end of piston C, and having around its lower face a notched surface, fitting a corresponding surface attached to the upper end of piece E, for the purpose of preventing any lateral motion of the upper end of the joint A when being held at a desired angle, substantially as described.

5. A coupling or sleeve, F, having a right and left thread upon its inner circumference, applied to the lower end of the mortised or cored piece B and the upper end of piece E, by which the mechanism is worked and governed, the combination being substantially as hereinbefore set forth and specified.

GEORGE H. BRIGGS.
JOSEPH T. CLARKSON.

Witnesses:
W. T. CLARKSON,
F. R. WHITCHER.